(12) United States Patent
Hanneman et al.

(10) Patent No.: US 8,612,205 B2
(45) Date of Patent: Dec. 17, 2013

(54) WORD ALIGNMENT METHOD AND SYSTEM FOR IMPROVED VOCABULARY COVERAGE IN STATISTICAL MACHINE TRANSLATION

(75) Inventors: Gregory Alan Hanneman, Pittsburgh, PA (US); Nicola Cancedda, Grenoble (FR); Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 763 days.

(21) Appl. No.: 12/814,657

(22) Filed: Jun. 14, 2010

(65) Prior Publication Data

US 2011/0307245 A1 Dec. 15, 2011

(51) Int. Cl.
| | |
|---|---|
| G06F 17/28 | (2006.01) |
| G06F 17/20 | (2006.01) |
| G06F 17/27 | (2006.01) |
| G10L 21/00 | (2013.01) |
| G06F 17/30 | (2006.01) |

(52) U.S. Cl.
USPC ............... 704/4; 704/7; 704/8; 704/9; 704/2; 704/277; 707/3; 707/5; 707/713

(58) Field of Classification Search
USPC ............... 704/4, 7, 8, 9, 2, 277; 707/3, 5, 713
See application file for complete search history.

(56) References Cited

U.S. PATENT DOCUMENTS

| | | | |
|---|---|---|---|
| 6,182,026 B1 | 1/2001 | Tillmann et al. | |
| 6,886,010 B2 * | 4/2005 | Kostoff | 1/1 |
| 6,917,936 B2 | 7/2005 | Cancedda | |
| 7,831,588 B2 * | 11/2010 | Jones et al. | 707/713 |
| 7,860,706 B2 * | 12/2010 | Abir | 704/4 |
| 8,060,360 B2 * | 11/2011 | He | 704/9 |
| 8,229,728 B2 * | 7/2012 | Huang et al. | 704/4 |
| 2004/0024581 A1 | 2/2004 | Koehn et al. | |
| 2004/0030551 A1 | 2/2004 | Marcu et al. | |
| 2005/0137854 A1 | 6/2005 | Cancedda et al. | |
| 2006/0190241 A1 | 8/2006 | Goutte et al. | |
| 2007/0010989 A1 * | 1/2007 | Faruquie et al. | 704/2 |
| 2007/0150257 A1 | 6/2007 | Cancedda et al. | |

(Continued)

OTHER PUBLICATIONS

The CASIA Statistical Machine Translation System for IWSLT 2009 by Maoxi Li, Jiajun Zhang, Yu Zhou, and Chengqing Zong, Proceedings of the International Workshop on Statistical Language Translation 2009, Tokyo, Japan, pp. 83-90.*

(Continued)

*Primary Examiner* — Paras D Shah
*Assistant Examiner* — Neeraj Sharma
(74) *Attorney, Agent, or Firm* — Fay Sharpe LLP (57) ABSTRACT

A system and method for generating word alignments from pairs of aligned text strings are provided. A corpus of text strings provides pairs of text strings, primarily sentences, in source and target languages. A first alignment between a text string pair creates links therebetween. Each link links a single token of the first text string to a single token of the second text string. A second alignment also creates links between the text string pair. In some cases, these links may correspond to bi-phrases. A modified first alignment is generated by selectively modifying links in the first alignment which include a word which is infrequent in the corpus, based on links generated in the second alignment. This results in removing at least some of the links for the infrequent words, allowing more compact and better quality bi-phrases, with higher vocabulary coverage, to be extracted for use in a machine translation system.

21 Claims, 7 Drawing Sheets

(56) References Cited

U.S. PATENT DOCUMENTS

| | | | |
|---|---|---|---|
| 2007/0265825 A1 | 11/2007 | Cancedda et al. | |
| 2008/0109209 A1* | 5/2008 | Fraser et al. | 704/4 |
| 2008/0154577 A1* | 6/2008 | Kim et al. | 704/2 |
| 2008/0221866 A1* | 9/2008 | Katragadda et al. | 704/8 |
| 2008/0262826 A1 | 10/2008 | Pacull | |
| 2008/0300857 A1 | 12/2008 | Barbaiani et al. | |
| 2009/0024612 A1* | 1/2009 | Tang et al. | 707/5 |
| 2009/0175545 A1 | 7/2009 | Cancedda et al. | |
| 2009/0248422 A1* | 10/2009 | Li et al. | 704/277 |
| 2010/0088085 A1* | 4/2010 | Jeon et al. | 704/7 |
| 2011/0246173 A1* | 10/2011 | Li et al. | 704/2 |

OTHER PUBLICATIONS

Brown, et al. "The Mathematics of Statistical Machine Translation: Parameter Estimation," Computational Linguistics, 19(2):263-311, 1993.

Koehn. "Europarl: A Parallel Corpus for Statistical Machine Translation," Proc. 10th Machine Translation Summit, pp. 79-86, Phuket, Thailand, 2005.

Koehn, et al. "Edinburgh System Description for the 2005 IWSLT Speech Translation Evaluation,". Proceedings of IWSLT 2005, Pittsburgh, PA, 2005.

http://www.statmt.org/wmt07/shared-task.html Accessed Feb. 5, 2010.

U.S. Appl. No. 12/690,504, Stymne, et al.

U.S. Appl. No. 12/427,149, Dymetman, et al.

Koehn, et al. Moses: Open Source Toolkit for Statistical Machine Translation, Proceedings of the ACL 2007 Demo and Poster Sessions, pp. 177-180, Prague, Czech Republic, 2007.

Koehn, et al. "Statistical Phrase-Based Translation," Proceedings of HLT-NAACL 2003, pp. 48-54, Edmonton, Canada, 2003.

Lardilleux, et al. "Lexicons or Phrase Tables? An Investigation in Sampling-Based Multilingual Alignment," Proceedings of the Third Workshop on Example-Based Machine Translation, pp. 45-52, Dublin, Ireland, 2009.

Lardilleux, et al., "A Truly Mutlilingual, High Coverage, Accurate, Yet Simple, Subsentential Alignment Method," Proceedings of the Eighth Conference of the Association for Machine Translation in the Americas, pp. 125-132, Waikiki, Hawaii, 2008.

Liang, et al. "Alignment by Agreement," Proceedings of the Human Language Technology Conference of the ACL, pp. 104-111, New York, New York, 2006.

Och, et al. "A Systematic Comparison of Various Statistical Alignment Models," Computational Linguistics, 29(1):19-51, 2003.

Papineni, et al. "BLEU: A Method for Automatic Evaluation of Machine Translation," Proceedings of the 40th Annual Meeting of the Association for Computational Linguistics, pp. 311-318, Philadelphia, PA, 2002.

Moore. "Improving IBM Word-Alignment Model 1," Proceedings of the $42^{nd}$ Annual Meeting of the Association for Computational Linguistics, Barcelona, Spain, Jul. 21-26, 2004, pp. 519-526.

Holmqvist, et al. "Getting to Know Moses: Initial Experiments on German-English factored translation," Proceedings of the Second Workshop on Statistical Machine Translation, Jun. 2007, pp. 181-184.

Koehn, et al. "Empirical Methods for Compound Splitting," Proceedings of the tenth conference on European chapter of the Association for Computational Linguistics, Budapest, Hungary, 2003.

U.S. Appl. No. 12/784,040, Dymetman, et al.

Koehn, et al. "Factored Translation Models," Proceedings of the 2007 Joint Conference on Empirical Methods in Natural Language Processing and Computational Natural Language Learning, Prague, Jun. 2007, pp. 868-876.

Koehn, et al. "Towards better Machine Translation Quality for the German-English Language Pairs," Proceedings of the Third Workshop on Statistical Machine Translation, Jun. 2008, pp. 139-142.

Moore, R. "Improving IBM Word-Alignment Model ," Proceedings of the $42^{nd}$ Annual Meeting of the Association for Computational Linguistics, Barcelona, Spain, Jul. 21-26, 2004, pp. 519-526.

Nießen, et al. "Improving SMT quality with morpho-syntactic analysis," International Conference on Computational Linguistics, Proceedings of the 18th conference on Computational linguistics—vol. 2, Jul. 31-Aug. 4, 2000.

Gale, et al. "A program for aligning sentences in bilingual corpora," Computational Linguistics 1991: 75-102 (1993).

Holmqvist, et al. "Improving alignment for SMT by reordering and augmenting the training corpus," Human Language Technologies: The 2009 Annual Conference of the North American Chapter of the ACL, pp. 245-253, Boulder, Colorado, Jun. 2009.

* cited by examiner

WORD ALIGNMENT METHOD AND SYSTEM FOR IMPROVED VOCABULARY COVERAGE IN STATISTICAL MACHINE TRANSLATION

BACKGROUND

The present exemplary embodiment is directed to the field of machine translation. It finds particular application in connection with the translation of words which are used infrequently in a parallel corpus of text used for building a machine translation system.

Out-of-vocabulary (OOV) words are a problem faced by machine translation (MT) systems. Even when translating test sets similar in nature to a system's training data, there will almost always be at least a small number of source-language words for which the system can produce no target-language translation. Current practice varies on the treatment given to OOV words in the output of an MT system. They may be simply passed along into the output, deleted from the output, looked up in another translation or system resource, or handled through a variety of on-the-fly techniques such as attempted spelling correction or synonym substitution.

Phrase-based statistical machine translation (SMT) systems employ a phrase table as a central resource. This is a probabilistic dictionary associating short sequences of words in two languages. When translating from a source to a target language, the phrase table is accessed to retrieve a set of bi-phrases, each of which includes a target phrase which matches part of a source sentence or other text string. The retrieved bi-phrases are input to a scoring model, which outputs an optimal translation of the source sentence using a subset of the retrieved bi-phrases.

The phrase table is often obtained by first aligning a parallel corpus at the level of the individual words. This alignment often relies on a tool called GIZA++. GIZA++ is a statistical machine translation toolkit that is used to train IBM statistical translation models (Models 1-5) and an HMM word alignment model. A further procedure then extracts phrase pairs (bi-phrases) and inserts them in a phrase table, together with the appropriate frequency statistics. The Moses system is the most common package for phrase extraction and decoding in statistical machine translation. For a description of the GIZA++ system, see, Franz Josef Och and Hermann Ney. A Systematic Comparison of Various Statistical Alignment Models. *Computational Linguistics*, 29(1):19-51, 2003 (hereinafter, Och and Ney). For a description of IBM statistical translation models, see Peter F. Brown, Stephen A. Della Pietra, Vincent J. Della Pietra, and Robert L. Mercer. The Mathematics of Statistical Machine Translation: Parameter Estimation. *Computational Linguistics*, 19(2):263-311, 1993 (hereinafter Brown, et al.). The Moses system is described in Philipp Koehn, et al. Moses: Open Source Toolkit for Statistical Machine Translation. Proc. ACL 2007 Demo and Poster Sessions, pages 177-180, Prague, Czech Republic, 2007 (hereinafter Koehn, et al. 2007).

In the standard GIZA++ word alignment of Och and Ney, the frequency of a word can have a large impact on its alignment results. It is often difficult to obtaining precise alignments for low-frequency words under the IBM models implemented in GIZA++.

It has now been observed that a significant fraction of out-of-vocabulary words (i.e., words in the source language that an SMT system is unable to translate) in a phrase-based SMT system do occur in the training data, but they are lost while the system is being built because of imprecise rareword alignment during the standard GIZA++ stage.

The exemplary embodiment provides a system and method which improves the initial word-to-word alignment process, such as that output by GIZA++.

INCORPORATION BY REFERENCE

The following references, the disclosures of which are incorporated herein in their entireties by reference, are mentioned:

Phrase based machine translation systems are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al.; U.S. Pub. No. 2004/0024581 entitled STATISTICAL MACHINE TRANSLATION, by Koehn, et al.; U.S. Pub. No. 2004/0030551 entitled PHRASE TO PHRASE JOINT PROBABILITY MODEL FOR STATISTICAL MACHINE TRANSLATION, by Marcu, et al.; U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; U.S. Pub. No. 2007/0265825, published Nov. 15, 2007, entitled MACHINE TRANSLATION USING ELASTIC CHUNKS, by Nicola Cancedda, et al.; and U.S. application Ser. No. 12/690,504, filed on Jan. 1, 2010, entitled STATISTICAL MACHINE TRANSLATION SYSTEM AND METHOD FOR TRANSLATION OF TEXT INTO LANGUAGES WHICH PRODUCE CLOSED COMPOUND WORDS, by Sara Stymne, et al.

Methods for building libraries of parallel corpora from which bilingual dictionaries can be generated are disclosed, for example, in U.S. Pub No. 20080262826, published Oct. 23, 2008, entitled METHOD FOR BUILDING PARALLEL CORPORA, by Francois Pacull; and U.S. patent application Ser. No. 12/427,149, filed on Apr. 21, 2009, entitled BI-PHRASE FILTERING FOR STATISTICAL MACHINE TRANSLATION, by Marc Dymetman, et al.

Methods for evaluating the quality of machine translation are disclosed, for example, in U.S. Pub. No. 2005/0137854, published Jun. 23, 2005, entitled METHOD AND APPARATUS FOR EVALUATING MACHINE TRANSLATION QUALITY, by Nicola Cancedda, et al., U.S. Pat. No. 6,917,936, issued Jul. 12, 2005, entitled METHOD AND APPARATUS FOR MEASURING SIMILARITY BETWEEN DOCUMENTS, by Nicola Cancedda; and U.S. Pub. No. 20090175545, published Jul. 9, 2009, entitled METHOD FOR COMPUTING SIMILARITY BETWEEN TEXT SPANS USING FACTORED WORD SEQUENCE KERNELS, by Nicola Cancedda, et al.

BRIEF DESCRIPTION

In accordance with one aspect of the exemplary embodiment, a method for generating word alignments from pairs of aligned text strings includes, from a corpus of text strings, receiving a pair of text strings comprising a first text string in a first language and a second text string in a second language. With a first alignment tool, a first alignment between the first and second text strings is generated which creates links between the first and second text string. Each link links a single token of the first text string to a single token of the second text string, the tokens of the first and second text strings including words. With a second alignment tool, a second alignment is generated between the first and second text strings, which creates links between the first and second text strings. Each link of the second alignment links at least one token of the first text string to at least one token of the second text string. A modified first alignment is generated by selectively modifying links in the first alignment, which each include at least one word which is infrequent in the corpus, based on links generated in the second alignment.

In another aspect, a system for generating word alignments from aligned text strings includes instructions stored in memory for receiving a source sentence in a source language and a target sentence in a target language from a text corpus, the target sentence having been automatically identified as being a translation of the source sentence; instructions for generating a first alignment between the source sentence and the target sentence by forming links, including some links that each link a source word with a target word; instructions for generating a second alignment between the source sentence and the target sentence by forming links, including some links that each link at least one source word with at least one target word. The instructions for generating the second alignment generate alignments for sentence pairs in the corpus which include fewer links, on average, than the instructions for generating a first alignment. Instructions are provided for identifying links in the second alignment which include infrequent words and, based on at least some of these identified links, modifying the first alignment to remove links between the infrequent words that are present in the second alignment links and other words of the first alignment which do not form a part of one of the identified second alignment links.

In another aspect, a method for generating word alignments from aligned sentences includes receiving a source sentence in a source language and a target sentence in a target language from a text corpus, the target sentence having been automatically identified as being a translation of the source sentence. With a processor, a word alignment is generated between the source sentence and the target sentence by forming links, including some links that each link a source word with a target word. A second alignment is generated between the source sentence and the target sentence by a method which generates alignments for sentence pairs in the corpus which include fewer links, on average, than the method for generating the first alignment, the second alignment including some links that each link at least one source word with at least one target word. Links in the second alignment which comprise infrequent words are identified and, based on at least some of these identified links, the first alignment is modified to remove links between the infrequent words that are present among the second alignment links and other words of the first alignment which do not form a part of one of the identified second alignment links.

DETAILED DESCRIPTION

The exemplary embodiment relates to a system, method, and computer program product for automatic generation of word alignments for source and target language sentence in a training corpus which finds application in phrase-based statistical machine translation, and to a bi-phrase table generated in accordance with the exemplary method. The system takes, as input, a pair of text strings (which can each be considered as a sequence of tokens), one in a first natural language (the source language), the other in a second natural language (the target language), and outputs an alignment in which each word of the source sentence is linked to at least one word of the target sentence (and vice versa). From the resulting alignment, and many such other alignments, a bi-phase table can be generated.

A "bi-phase," as used herein, is a pair of phrases (each phrase comprising a sequence of one or more words), one phrase from the source language and the other from the target language, which the automated system used for extracting bi-phrases has output as a translation of each other in at least the source language to target language direction.

Out-of-vocabulary (OOV) words are source words which do not appear in bi-phrases in the phrase table (except, possibly, in multi-word combinations), and therefore cannot be translated by a translation system which relies on the phrase table (unless the multi-word combination is present in the text). The present system and method enables OOV words that occur in the training data to be retained while the system is being built rather than discarding them due to imprecise rare-word alignment during the standard word alignment stage. The number of OOV words in the output of a phrase-based SMT system can thus be reduced by specifically modifying the system-building process to increase vocabulary coverage. It also enables a greater number of meaningful bi-phrases to be generated, i.e., bi-phrases which are short enough to be found in a source text to be translated.

To address the problem of rare words, a new technique for refining the GIZA++ alignment process (or other word alignment method) with rare-word alignments from alternative toolkits is employed. Though the alternative toolkits may be unsuitable for aligning the whole corpus on their own, using them in a more controlled manner is beneficial. In particular, the present method gives improved vocabulary coverage without loss of output quality.

Evaluations of the present system show that reductions in OOV rates on a particular test set of between 24% and 26% can be achieved for two different language pairs, or up to 77% of the distance to the best theoretical test-set OOV rate, given the training data. At the same time, human judges rank the refined output of the present method higher than output from GIZA++ or the alternative toolkits.

The method is not limited to any particular phrase-based SMT system and can be incorporated, for example, into any of the systems mentioned above and incorporated herein by reference. For other SMT systems in which the method could be used, see, for example, Philipp Koehn, Franz Josef Och, and Daniel Marcu. Statistical Phrase-Based Translation. *Proc. HLT-NAACL* 2003, pages 48-54, Edmonton, Canada, 2003.

The system and method operate on the assumption that OOV words are not merely words that do not appear in the system's training data. Rather, it has been found that that a significant number of OOV words do appear in the training data. However, they were lost among the data processing and resource extraction steps performed in building the system from that data. For example, in one particular test set, between 31% and 36% of the OOV words did appear in the training data but did not survive the translation system training phase. Some of these words which are lost may be singletons, i.e., words which occur only once in the training corpus, although words which occur with somewhat higher frequency may also be lost. The loss of these words may occur during filtering or pre-processing the training corpus, statistically aligning words in a given source-language sentence to their translations in the target-language sentence, or the extraction of scored translation fragment pairs ("bi-phrases") from those word alignments. In particular, as outlined in the OOV study in the Example section below, it was found that virtually all of the vocabulary loss occurs because of problems in the word alignment stage.

While the GIZA++ word alignment system is prone to vocabulary loss, other alignment systems also suffer from problems. In a study of two existing alternative alignment approaches, the Anymalign system and the Berkeley aligner, it has been found that these systems do not suffer as much from the vocabulary loss problem, but overall performance of translation systems built with bi-phases generated from their outputs does not match that of GIZA++. For details of the Anymalign system, see Adrien Lardilleux and Yves Lepage. A Truly Multilingual, High Coverage, Accurate, Yet Simple, Subsentential Alignment Method. Proceedings of the Eighth Conference of the Association for Machine Translation in the Americas, pages 125-132, Waikiki, Hi., 2008 (hereinafter, Lardilleux and Lepage 2008). The Berkeley aligner is described in Percy Liang and Ben Taskar and Dan Klein. Alignment by Agreement. *Proceedings of the Human Language Technology Conference of the ACL*, pages 104-111, New York, N.Y., 2006 (hereinafter Liang, et al.).

The present embodiment provides an alignment approach which combines multiple word alignment systems, such as the GIZA++ word alignment system with one or both of the Anymalign system and the Berkeley aligner in a way which leverages the different behaviors of each type of system. Empirical results on OOV rate and output quality of the resulting system are presented below.

The "Garbage Collector" Phenomenon

One problem addressed by the present method is that the frequency of a word in the training corpus can have a large impact on its alignment results. The term "garbage collector" was coined by Peter F. Brown, and others, to refer to rare words on one side of a parallel sentence that generate large numbers of incorrect word alignment links to the other side. The phenomenon has been found to be particularly problematic in IBM word alignment Model 1, as noted by Moore (see Robert Moore. Improving IBM word-alignment Model 1. *Proc. 42$^{nd}$ ACL Meeting*, pages 518-525, Barcelona, Spain, July 2004), providing an intuitive example of a parallel sentence where a rare source-side word co-occurs with its correct target-side translation in the presence of a more common source word that co-occurs with an infrequent target translation. In such a situation, the overall alignment probability is higher if the rare source word generates both its correct translation and the infrequent translation of the common source word, each with probability 0.5, rather than the rare source word being correctly aligned with probability 1.0 and the common source word generating its infrequent translation with a correspondingly low probability.

The problem is not limited to Model 1. Significant evidence for the garbage collector problem can be found using the entire GIZA++ cascade of IBM models (through Model 4).

The GIZA++ system is able to perform only unidirectional alignments: i.e., it can perform one in the source-to-target-direction, where each source word is linked to one or more target words (but not vice versa), and another for the target-to-source direction where each target word is linked to one or more source words (but not vice versa). The results of the two unidirectional alignments can then be "symmetrized," i.e., a union of sorts between the two alignments is performed to generate a single, symmetrized alignment (this is not necessarily a simple addition of all the alignments from each direction). This symmetrization often adds additional links to the alignment matrix and results in the situation where a source word can be linked to many target words and is at the same time part of a group of source words all linked to the same target word.

Figure 1:
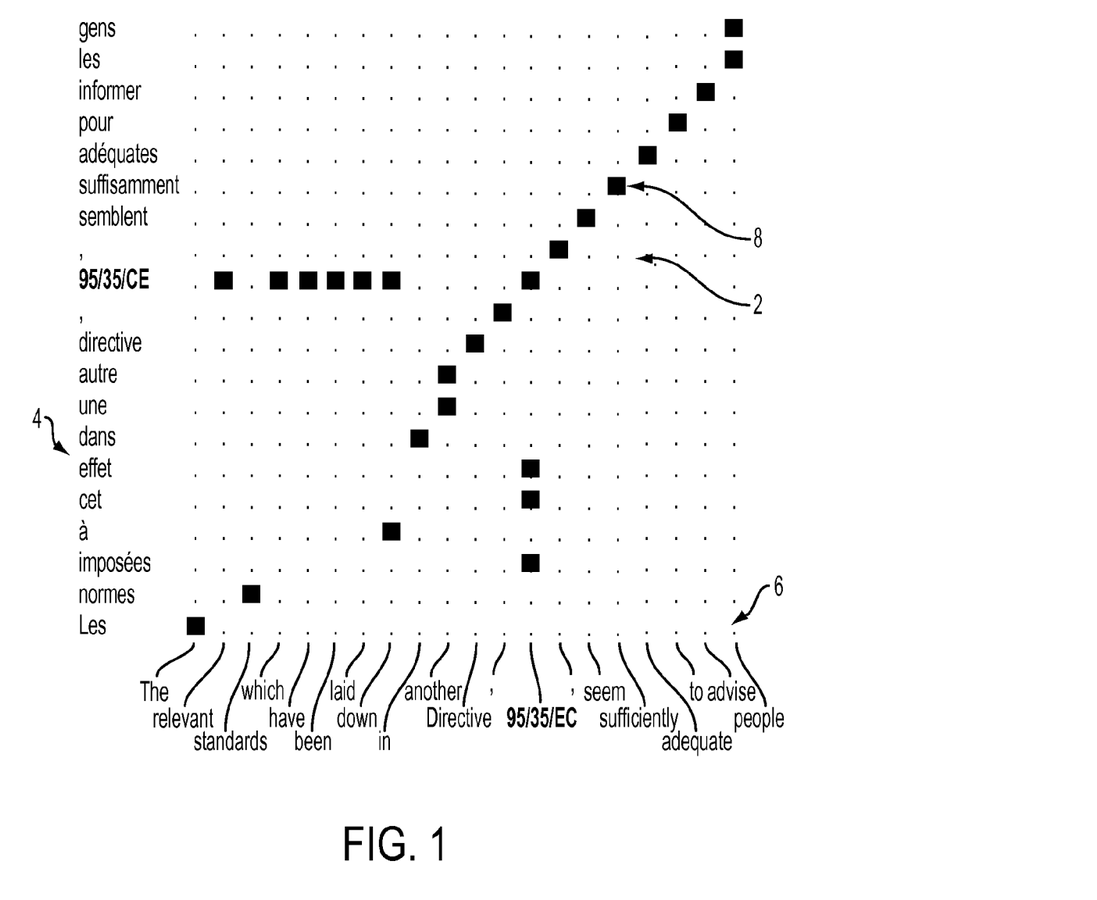
FIG. 1 is an example of an alignment for tokens of a partial French-English sentence where 95/35/CE and 95/35/EC represent words which are singletons, demonstrating the phenomenon where such words generate a large number of incorrect alignment links.

FIG. 1, by way of example, shows a partial example sentence from a French-English training corpus. The black squares represent symmetrized alignments. The symmetrization of the unidirectional alignments was performed using the "grow-diag-final" heuristic (see Philipp Koehn, Amittai Axelrod, Alexandra Birch Mayne, Chris Callison-Burch, Miles Osborne, and David Talbot. Edinburgh System Description for the 2005 IWSLT Speech Translation Evaluation. *Proceedings of IWSLT* 2005, Pittsburgh, Pa., 2005, hereinafter Koehn, et al. 2005). The bolded words "95/35/CE" and "95/35/EC" are singletons, appearing only once in their respective sides of the entire French-English parallel corpus. Though the correct alignment link between the two words is included, the French singleton generates six additional incorrect links and the English singleton generates three. The more common French word "imposées" should be translated as the entire English phrase "which have been laid down," or at least as the key words "laid down." Instead, these less frequent words are covered by the singleton "95/35/CE," which represents a word in the sentence.

Garbage collector words, which are generally low-frequency (rare in the corpus) words, have a severe impact on phrase extraction from sentences like those in FIG. 1 because of the requirement that all extracted bi-phrases must be "consistent" with the underlying word alignments. That is, all words within a bi-phrase must only be aligned to other words within the bi-phrase, and all words outside of a bi-phrase must only be aligned to other words outside the bi-phrase. Following this requirement, the smallest bi-phrase containing "95/35/CE" that is extractable from the example sentence is eleven words long in French and twelve words long in English (corresponding to "normes . . . 95/35/CE" in French and "relevant . . . 95/35/EC" in English). Unfortunately, this is far above the default maximum phrase length of seven words specified in the Moses phrase extraction system (Koehn, et al. 2007).

Nearby words experience extraction problems as well: the smallest consistent phrase containing "laid," or any other word in French or English aligned with "95/35/CE" or "95/35/EC," in this sentence is also 11 by 12 words. Since small, precise bi-phrases are blocked from large areas of the parallel sentence, the resulting phrase table risks being less precise (and less usable for translating new sentences) because some vocabulary items only appear in large phrases that are unlikely to match a new source sentence.

Precise Alignments for Rare Words

A problem with other existing alignment systems is that the resulting phrase table can be too large or too small, depending on the methods used. Unlike the GIZA++ method, the Anymalign method does not undergo a word alignment phase prior to bi-phrase extraction. Rather, the output of the Anymalign system is bi-phrases. In particular, the Anymalign alignment and phrase extraction method described in Lardilleux and Lepage 2008 detects "perfect alignments" by computing the cosine difference between source-language words or phrases and target-language words or phrases. Words that appear on exactly the same lines in a parallel corpus are extracted as bi-phrases. In general, the probability of finding such perfect alignments decreases as the corpus size increases, so the Anymalign system carries out its computations on small, repeated random subsamples of the corpus. Bi-phrases which are extracted from fewer than a predetermined number of these "sub-corpora" are generally ignored.

In practice, since even in small sub-corpora it is unlikely that a common word will appear exactly on the same lines as a very rare word, the Anymalign system is able to extract precise translations for infrequent words. However, its overall phrasal coverage lags far behind that of GIZA++ and phrase-based SMT extraction heuristics, by a factor of up to 40 (See, Adrien Lardilleux, Jonathan Chevelu, Yves Lepage, Ghislain Putois and Julien Gosme. Lexicons or Phrase Tables? An Investigation in Sampling-Based Multilingual Alignment. *Proc. 3rd Workshop on Example-Based Machine Translation*, pages 45-52, Dublin, Ireland, 2009). The Anymalign system is thus insufficient as a stand-alone phrase extractor, but in the present system, it can provide a complementary strength to the GIZA++ system at the unigram level.

The Berkeley unsupervised aligner (see, Liang, et al.) is based on a portion of the same series of IBM word alignment models used in GIZA++, but the models are trained in both directions at the same time (unlike the GIZA++ system where a symmetrization phase follows the two unidirectional alignments). As a consequence, the source-to-target alignments are able to take into account the target-to-source alignments as they are being learned, and vice versa. This allows the Berkeley aligner to avoid many instances of the garbage collector phenomenon. In the example of FIG. 1, the correct alignment "95/35/CE" ↔ "95/35/EC" is strengthened during training because it is among the links generated in both the English-to-French and French-to-English directions, while incorrect unidirectional links are not boosted in this way. The result is a sparser alignment. However, this applies not only for rare words, but across the training corpus in general. During Moses phrase extraction, the sparser word alignments lead to a much larger and much more ambiguous phrase table, more than twice the size of the corresponding table extracted from GIZA++ alignments. When filtered to a given test set, around four times as many bi-phrases are kept.

The problem with the Berkeley aligner is, in some sense, complementary to the problem with Anymalign. Whereas the Anymalign phrase table is too small to be used in isolation, the Berkeley phrase table may be too large.

The Exemplary Alignment Refining Technique

For reasons outlined above, the present system and method retain most of the GIZA++ alignment links. Here GIZA++ is used as an example first word alignment system, bearing in mind that other available or later developed word alignment systems which attempt to provide an alignment for every source word with at least one target word are also contemplated. To reduce the elimination of rare words, a portion of the alignments are refined, specifically, those in the problem area of low-frequency words, using an alternative, second alignment process. This combination enforces a new hard alignment replacement constraint for low-frequency words, as detailed below.

Figure 2:
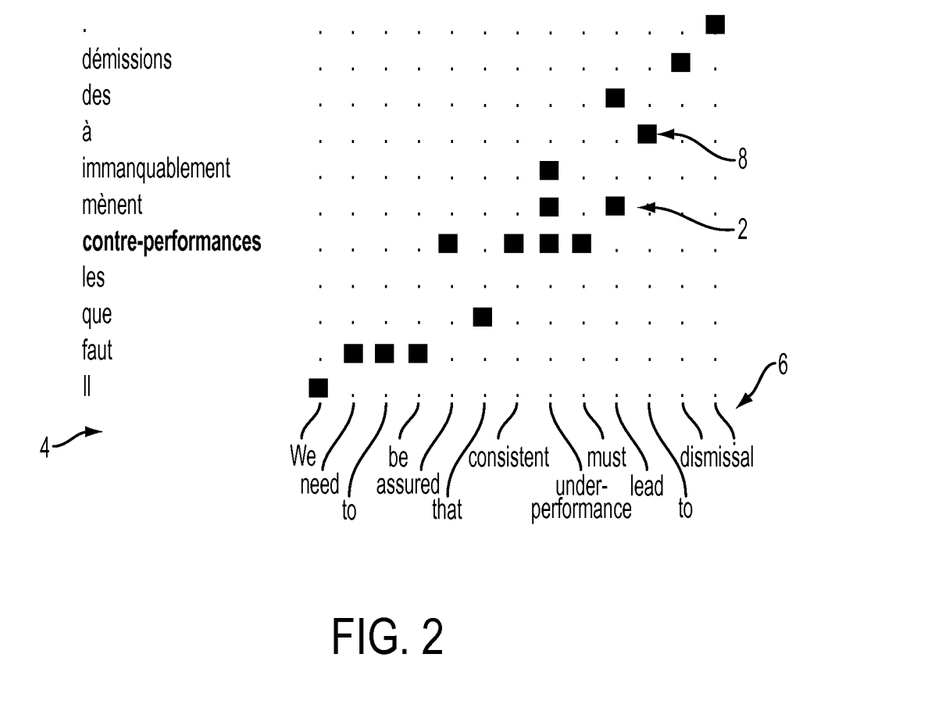
FIG. 2 illustrates an alignment of tokens of source and target sentences output by the GIZA++ system.
Figure 3:
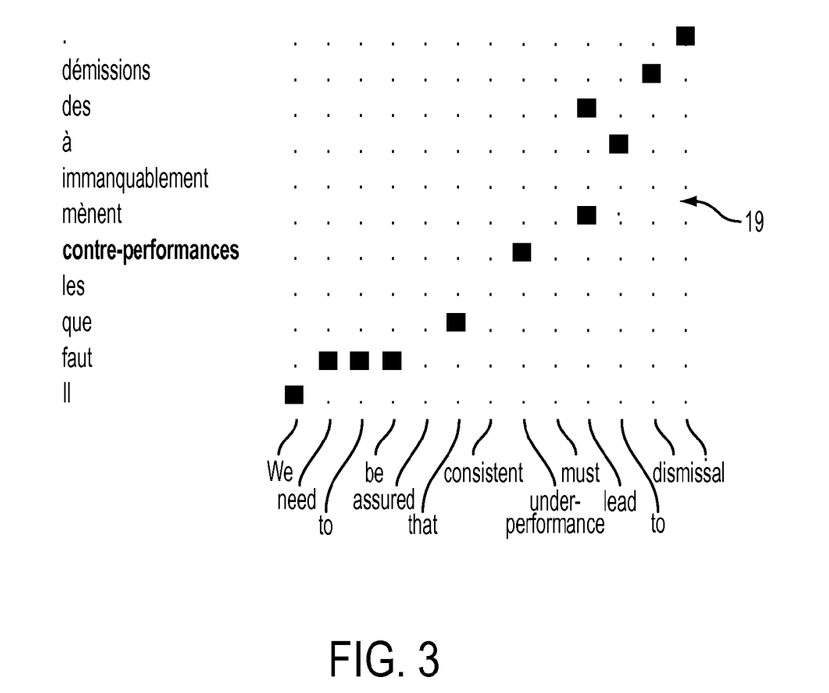
FIG. 3 illustrates the alignment achieved after modifying only rare word alignments (here, contre-performances) in the alignment of FIG. 2 with the alignment output by a bi-phrase alignment system (the Anymalign system)

By way of example, FIG. 2 illustrates an example of GIZA++ alignment 2 of a source-target sentence pair (here, the source sentence 4 is in French and the target sentence 6 is in English). Blocks represent links 8 in the alignment. Each link 8 links exactly one source token with exactly one target token. (Note, however, that the system has not been able to provide an alignment for the French word les). FIG. 3 shows a modified alignment of the same sentence pair after refining the GIZA++ alignment with the bi-phrase "contre-performances" ↔ "under-performance" and dropping other links stemming from both these words. As can be seen, the resulting alignment includes fewer links 8 which involve the rare word.

Figure 4:
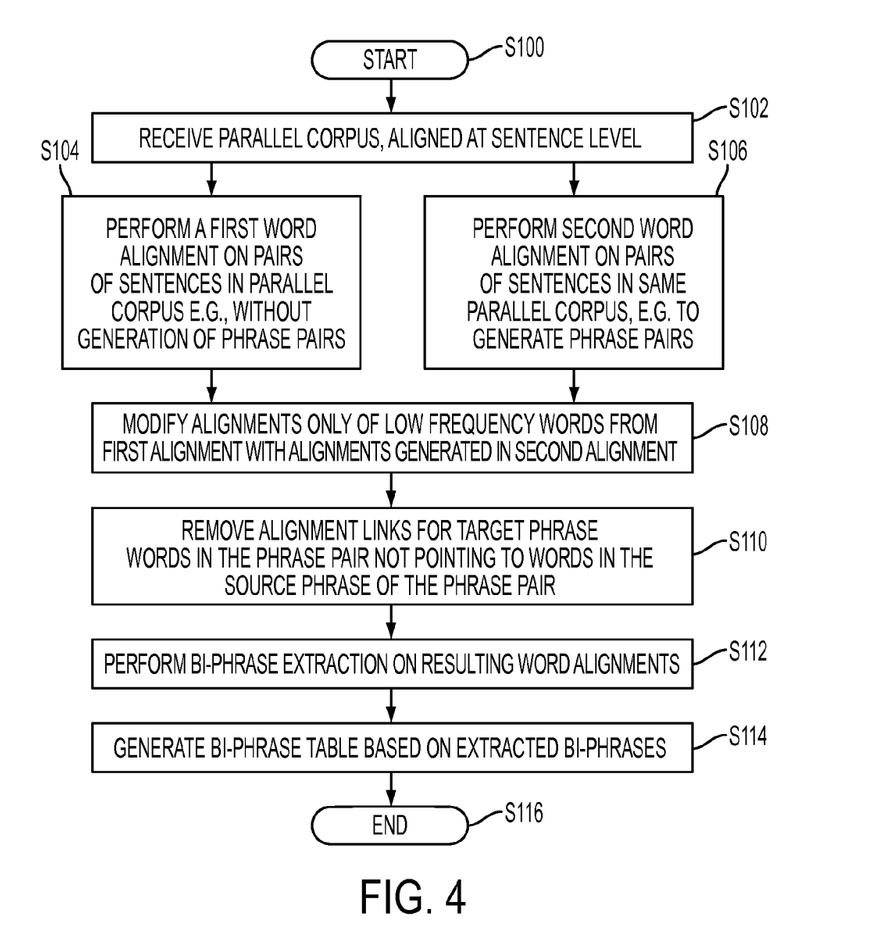
FIG. 4 is a flow diagram illustrating an alignment method in accordance with one aspect of the exemplary embodiment.
Figure 5:
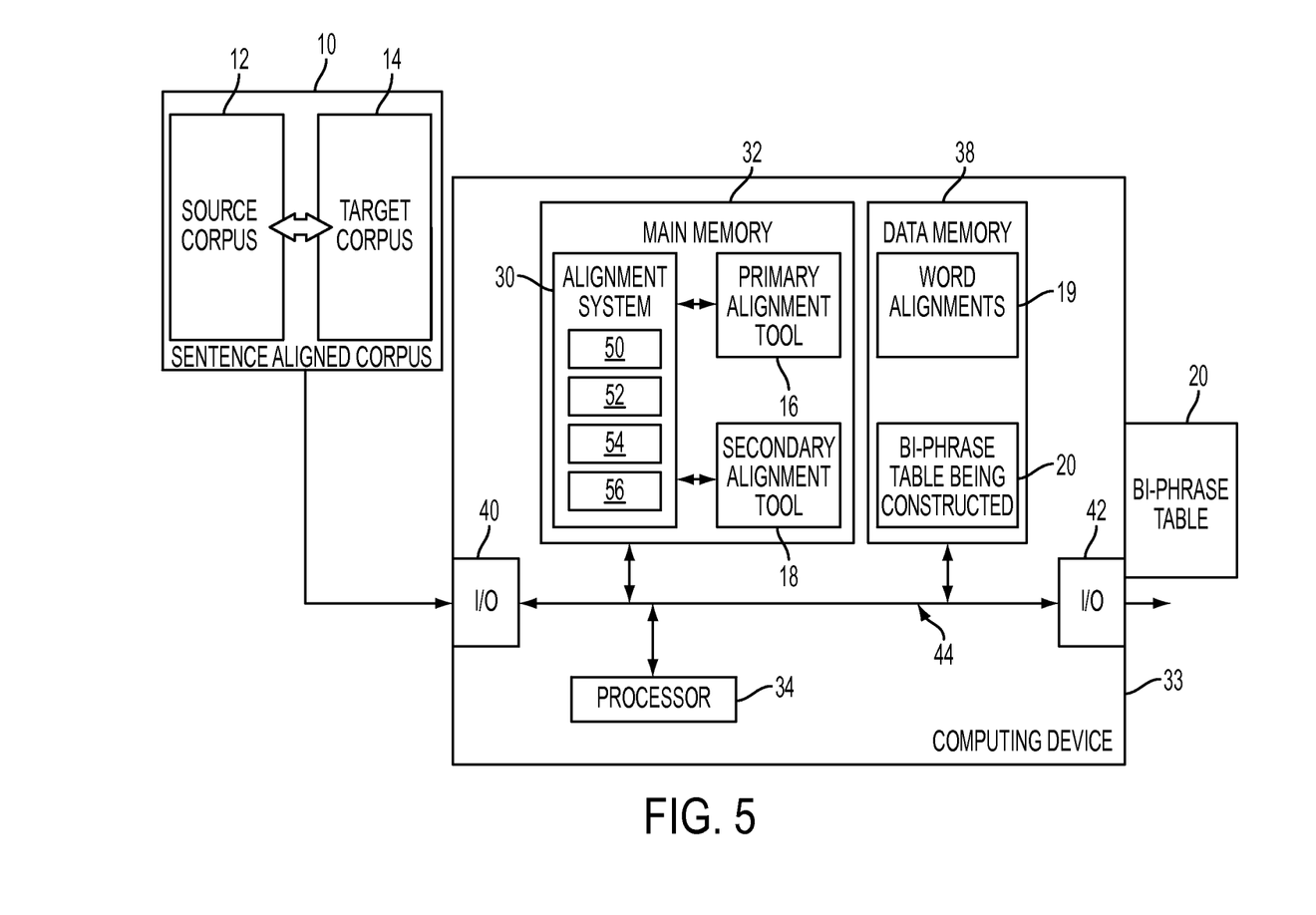
FIG. 5 is a functional block diagram of an alignment system in accordance with another aspect of the exemplary embodiment.

FIG. 4 illustrates the exemplary method. A system for performing the method is shown in FIG. 5. The method begins at S100.

At S102 a parallel corpus 10 is provided. The corpus includes a text corpus 12 comprising a large body of text in a source language, such as French, and a text corpus 14 comprising a large body of text in a target language, such as English. The corpus 10 includes portions of text in each language that have been determined to be mutual translations of each other. The text in the parallel corpus 10 is aligned at the sentence level, i.e., each source sentence is matched with a corresponding target sentence as a sentence pair. Methods for automatically identifying sentences which are expected to be mutual translations of each other are well known. For example, two documents which are expected to be mutual translations are first aligned at the paragraph level, e.g., by considering the layout of the two documents. Then, within each aligned pair of paragraphs, the sentences can be aligned by considering various heuristics, e.g., the order, number of words, etc. All of this can by performed automatically by a suitable computer which includes a processor for executing the instructions. Methods for aligning sentences in parallel corpora are described, for example, in W. A. Gale and K. W. Church, A program for aligning sentences in bilingual corpora, *Computational Linguistics* 1991: 75-102 (1993). Methods for identifying parallel corpora are disclosed, for example, in U.S. Pub No. 20080262826, published Oct. 23, 2008, entitled METHOD FOR BUILDING PARALLEL CORPORA, by Francois Pacull.

Once the pairs of matching sentences have been identified, other preprocessing may be performed on the corpus 10 to filter out sentences which may be expected to contribute negatively to the SMT system performance. For example, sentences where the number of words or other tokens in one sentence of a pair is substantially larger than in the other may be filtered out. Additionally pairs which include sentences which exceed a predetermined length may be filtered out. The sentence pairs are tokenized, i.e., each sentence (or more generally, a text string) is converted to a sequence of tokens. The tokens are primarily words but may also include other tokens, such as numbers and punctuation, e.g., periods and commas. Hyphenated or compound words may be extracted as a single token or processing may be performed to split them into shorter tokens with the appropriate structure for the language in question.

At S104, the optionally preprocessed parallel corpus 10 of sentence pairs is processed with a primary alignment software tool 16, such as GIZA++. This tool takes each of a large set of sentence pairs in the corpus and generates an alignment for each sentence pair between words of the source sentence and words of the target sentence in the sentence pair. The primary alignment software tool 16 generates the first alignment without generation of bi-phrases or other restricted text sequences from which the word alignments are required to be drawn. (This, on average, may result in a larger number of links than would be the case with a secondary alignment tool 18, such as the Anymalign or Berkeley systems, although it is not always the case for every sentence pair).

In particular, the first alignment process generates an alignment comprising a set of links 8. Each link 8 links a single token of the source sentence to a single token of the target sentence. Each token may participate in one or more of these links. As a result, each word (or other token) in the source text string is generally aligned with at least one word (or other token) in the target text string and vice versa. In a few cases, where there is no word with which to align, the system may generate a special NULL alignment to indicate that the source (or target) word has no real alignment. In the exemplary embodiment, the primary alignment software tool may be run separately in source-to-target and target-to-source directions. The resulting unidirectional alignments can then be symmetrized with a heuristic, such as the "grow-diag-final" heuristic (see, Koehn, et al., 2005) to produce the first alignment. The word alignments for each sentence pair can be stored in the form of a matrix, such as that shown in FIG. 2, or analogous data structure in computer memory 36.

At S106, the same, optionally preprocessed parallel corpus 10 is processed with the secondary alignment software tool 18 such as the Anymalign or Berkeley software tool to produce a second alignment. In the case of the Berkeley alignment tool, word alignments are generated, from which bi-phrases can be extracted. In the case of the Anymalign system, bi-phrases, rather than word alignments are output by the system. The word/phrase alignments can be stored in the form of a matrix or analogous data structure in computer memory 36.

At S108, working on the word alignment output of S104, alignments for low-frequency words are modified in situ based on the alignments generated in the second alignment. Specifically, the word alignments derived from the phrase/word pairs, extracted on the same parallel corpus 10 in S106, are used to modify only a subset of the links 8 generated in the first alignment, in particular, those links which are associated with the low-frequency words (or bi-phrases comprising low-frequency words in the case of a phrase alignment, such as Anymalign). In this step, only a small portion of the alignment links generated at S104 are modified. For those alignments where there are no low-frequency words or phrases identified, no modifications are made to the first alignment.

The scope of the replacements can be varied by adjusting at least one of the following two parameters. A first selectable parameter is a low-frequency cutoff f which sets the maximum number of times a word can appear in the corpus and still count as a "low-frequency" word. These words are those that may have their alignments refined according to the phrase/word pairs output in S106. For example $f \geq 1$ and in one embodiment, $f \leq 10$. For example, f can be 1, 2, 3, 4, 5, or 6, e.g., up to 4. For example, when f is 4, all words which are present more than four times in the source side of the corpus are not candidates for replacement.

Another parameter (applicable to the Anymalign system) relates to the bi-phrases from which the word alignments are extracted in the second alignment (S106). If there are too few occurrences of the bi-phrases, these alignments can be ignored. In the case of the Anymalign tool, for example, the Anymalign cutoff k sets the minimum number of sub-corpora that an Anymalign bi-phrase must have been extracted from in order for it to count as a valid replacement bi-phrase. The sub-corpora are randomly sampled portions of the corpus 10, that may overlap in content.

This method therefore acts as a hard constraint: all alignments will be replaced provided they satisfy the two thresholds: i.e., where word frequency is no greater than f (e.g., $\leq 4$) and bi-phrase frequency in the sub-corpora is at least k (e.g., $\geq 4$). In other embodiments, only parameter f is considered.

Thus, part of the exemplary method may include defining a value of f and/or k, e.g., by a trial and error approach in which translation systems built with different values of the parameters are evaluated. These values are then used on the entire corpus.

As an example, consider the sentence pair in FIG. 2, where the French word "contre-performances" is a singleton in an exemplary French-English parallel training corpus 10. Using the same corpus, the Anymalign system is run for 18 hours and the resulting phrase table is examined. (The public release of the Anymalign system is parameterized by time rather than by number of corpus subsamples.) It contains the bi-phrase "contre-performances"↔"under-performance" with a count of four. Accordingly, with thresholds $f \geq 1$ and $k \leq 4$, all alignment links in the sentence for the source-side phrase "contre-performances" will be removed except for the link pointing to the target side "under-performance".

At S110, in order to remain consistent, any alignment links from the target phrase of one of the bi-phrases or word pairs extracted in S106 not pointing to a word within the corresponding source phrase/word will also be removed. As will be appreciated, S108 and S110 can be performed in a single step.

The refined alignment for the example of FIG. 2 is shown in FIG. 3. By comparing FIGS. 2 and 3, it can be seen that several links 8 have been removed by the exemplary process. Specifically, the links between the low frequency word ("contre-performances") on the source side of the replacing bi-phrase and all words in the target sentence 6 which are not in the target side of the replacing bi-phrase are removed in S108. This results in the removal of the links between "contre-performances" and the target words "assured," "consistent," and "must". Similarly, all the links between the target side "under-performance" of the replacing bi-phrase and words of the source sentence 4 which are not in the source side of the replacing bi-phrase are removed. This results in the removal of the links between "under-performance" and the words "immanquablement" and "mènent" from the alignment at S110. As will be appreciated, only those sentence pairs with infrequent words may be modified in this process.

Because the Anymalign system generates bi-phrases rather than word pair alignments, the bi-phrase selected to refine the links in the first alignment 2 may include one or more frequent words (i.e., a word which has a frequency f in the corpus 10 which is greater than the upper threshold). For example, if in the case of the sentences of FIG. 2, Anymalign produced an alignment in which the bi-phrase "contre-performances mènent"↔"under-performance must" was generated, then all the links for these words in the first alignment 2 would be removed, except for the existing ones between these four words: i.e., "contre-performances" would remain aligned with both "under-performance" and "must."

While the Berkeley system outputs word alignments, in the exemplary embodiment, bi-phrases are extracted from these word alignments and used in the same way as the Anymalign bi-phrases, although it is also contemplated that in other embodiments, word alignments from the Berkeley system may be used directly. In the exemplary embodiment, since bi-phrases are used, the entire source and/or entire target side of an Anymalign bi-phrase generated in S106, or bi-phrase generated from a Berkeley alignment, is required to be made up of low-frequency words in order for it to be used in the modification of the first alignment 2. Given the low-frequency cutoff f, the parallel corpus 10 is preprocessed to identify the source and target words that appear only f times or fewer. These are the low-frequency words. Then, the bi-phrases for the second alignment are reviewed to identify those whose source and/or target sides are made up entirely of low-frequency words. These are the candidate bi-phrase replacements, which, if the Anymalign system is being used, may be filtered based on frequency count according to the Anymalign cutoff k. Then, any surviving phase pair alignment is imposed on the first alignment 2.

As will be appreciated from the foregoing, the second alignment step S106 may be performed prior to or during the first alignment step S104. Indeed, in one embodiment, the entire corpus 10 of preprocessed sentence pairs may be processed first with the secondary alignment tool 18 to identify bi-phrases which meet the f (and, optionally, k) thresholds. All other bi-phrases are filtered out. Then, when the first alignment has been performed, any remaining bi-phrases from the second alignment of the sentence pair can be used to modify the first alignment.

At S112, phrase extraction is performed on the modified word alignment 19 of the text strings output at the end of S110, in order to extract bi-phrases for a bi-phrase table. This step can be performed with a standard bi-phrase extraction system, such as the Moses system described in Koehn, et al. 2007. Each extracted bi-phrase includes one or more words from a source string 4 and one or more words from a corresponding target string 6, which obey certain constraints such as:

a) a requirement that all words within a bi-phrase must only be linked, in the alignment, to other words within the same bi-phrase, and b) all words outside of a bi-phrase must only be aligned to other words outside the bi-phrase.

Other constraints, such as that the bi-phrase can only be up to N words in length on either side, or be exactly N words, may also be applied. Some of the bi-phrases may also be filtered out based, for example, on their frequency of occurrence, to reduce the overall size of the bi-phrase table (see for example, U.S. application Ser. No. 12/427,149, filed on Apr. 21, 2009, entitled BI-PHRASE FILTERING FOR STATISTICAL MACHINE TRANSLATION, by Marc Dymetman, Nadi Tomeh, and Nicola Cancedda).

At S114, a bi-phrase table 20 is generated from the extracted bi-phrases and stored in computer memory 38 and/or output. In contrast to the single word to single word links output at S110, the bi-phrase table 20 includes at least some bi-phrases which include more than one word on the target side, source side, or both, but may also include bi-phrases which include only one word on both the source and target sides. Associated with each bi-phrase is a measure representative of its frequency in the corpus 10. The bi-phase table 20 may be used in a phrase-based statistical machine translation system for translation of input source texts into the target language. Such a translation system retrieves bi-phrases from the bi-phrase table 20 which cover portions of an input text string and identifies an optimal translation using a subset of the retrieved bi-phrases (see for example, U.S. Pub. Nos. 2008/0300857, 2006/0190241, 2007/0150257, 2007/0265825). A suitable phrase-based SMT system is the MATRAX™ system developed by Xerox, although the method is not limited to such a translation system.

The method ends at S116.

While the method has been described in terms of performing two alignments, e.g., GIZA++/Anymalign or GIZA++/Berkeley, it is also contemplated that more than two alignments could be performed. For example, if the Anymalign alignment results in a bi-phrase of two or more words to be used in replacing the rare word, the Berkeley system could be used instead, although this may not necessarily lead to an optimal bi-phrase.

With reference to FIG. 5, an alignment system 30 suitable for generating a phrase table 20 is shown. The system 30 may be in the form of hardware or a combination of software and hardware. In the exemplary embodiment, the system 30 is in the form of software instructions stored in main memory 32 of a computing device 33, which are executed by an associated processor 34. The instructions 30 stored in memory 32 generate a word alignment 19 for each of a set of text strings of a parallel corpus 10, which may be stored in data memory 38 during processing. The word alignments 19 are used in generating a bi-phrase table 20. The computer 33 includes one or more input/output devices 40, 42 for communicating with a remote memory storage device which stores the corpus 10. Alternatively, the corpus 10 may be stored in memory of the computing device 30. Components 32, 34, 38, 40, 42 of the computer device 33 communicate via a data/control bus 44.

The exemplary system 30 includes or has access to the primary and secondary alignment tools 16, 18 and may include various software subcomponents 50, 52, 54, 56 for performing the exemplary method, including a component 50 for generating a first word alignment 2 with the primary alignment tool 16 for each of a large set of pairs of aligned sentences from the corpus 10 (S104), a component 52 for generating a second, potentially different, word or phrase-based alignment with the secondary alignment tool 18 for each of the large set of pairs of aligned sentences from the corpus 10 (S106), a component 54 for selectively replacing only a portion of the previously generated links 8 in the first word alignment 2 with those generated using the secondary alignment tool 18 (where the output of the second tool is different) and optionally removing any extraneous links (S108, S110), and a component 56 for extracting bi-phrases (S112) and generating a bi-phrase table 20 (S114) using the refined word alignments. In some embodiments, two or more components may be combined. For example a single set of software instructions could replace the tools 16 and 18.

The digital processor 34 can be variously embodied, such as by a single-core processor, a dual-core processor (or more generally by a multiple-core processor), a digital processor and cooperating math coprocessor, a digital controller, or the like. The digital processor 34, in addition to controlling the operation of the computer, executes instructions stored in memory 32 for performing the method outlined in FIG. 3.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Memory 32, 38 may include, for example, read only memory (ROM), random access memory (RAM), flash memory, or any combination of the above as a single component or distributed components.

The method illustrated in FIG. 4 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the alignment method.

Without limiting the scope of the exemplary system and method, the following Examples compare the present method with existing methods.

EXAMPLES

Example 1

A Comparison of Different Alignment Systems

Phrase tables 20 for a phrase-based machine translation system were constructed according to the exemplary method using as the corpus 10, the French-English and German-English versions of the Europarl corpus, described in Philipp Koehn. Europarl: A Parallel Corpus for Statistical Machine Translation, *Proc.* 10*th Machine Translation Summit*, pages 79-86, Phuket, Thailand, 2005 (hereinafter Koehn 2005). The performance of such a translation system was compared with those using phrase tables derived using existing word/phrase alignment methods. Performance was calculated by determining OOV statistics with respect to the Europarl "test2007" test set from the 2007 Workshop in Machine Translation (available at www.statmt.org/wmt07/shared-task.html). The test set includes a set of source sentences in the same language as used in the generation of the bi-phrase table which are translated by the SMT into target sentences. Five different systems for word alignment and phrase extraction were evaluated as follows:

1. GIZA++: Baseline GIZA++ word alignment, using the grow-diag-final symmetrization heuristic (see Koehn, et al. 2005), followed by standard Moses phrase extraction (see Koehn, et al. 2007).

2. Anymaliqn: Baseline Anymalign phrase extraction, run for 18 hours on French-English and 19.75 hours on German-English (the time difference is proportional to the difference in size of the two corpora).

3. Berkeley: Baseline Berkeley word alignment, followed by standard Moses phrase extraction.

4. Ref-Anym: The exemplary refinement method, using the GIZA++ output (as for 1) modified by an Anymalign phrase table generated from the same corpus, using thresholds f=4 and k=1, followed by standard Moses phrase extraction.

5. Ref-Berk: The exemplary refinement method, using the GIZA++ output (as for 1) modified by a Berkeley phrase table generated from the same corpus, and a threshold f=4, followed by standard Moses phrase extraction.

The bi-phrase tables built by each of these methods were then incorporated into a statistical machine translation system and tested using the Europarl "test2007" test set, as noted above. The machine translation system used was of the type described in Koehn, et al. 2007.

A. OOV Rate Results

Figure 6:
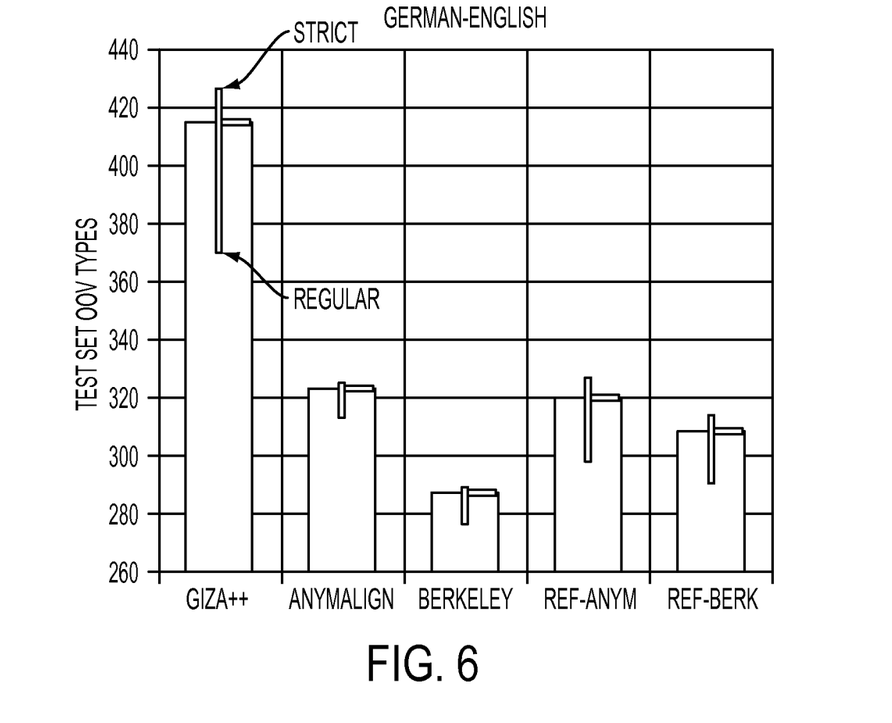
FIG. 6 is a graph for a German-English translation system showing the number of out-of-vocabulary (OOV) word types recorded on a test set (the test2007 set) for each of five alignment system configurations, where the vertical bars indicate the exact OOV rate and the vertical lines mark the interval between the OOV counts obtained using the regular and strict phrase table vocabulary.
Figure 7:
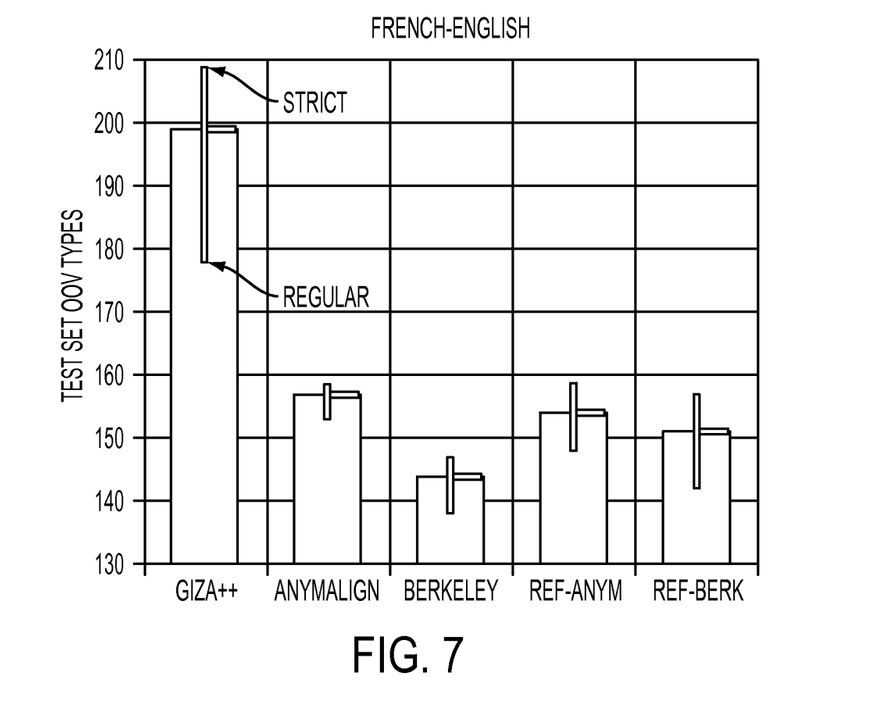
FIG. 7 is a graph as for FIG. 6, but for a French-English translation system.

In terms of the test-set OOV rate, the Anymalign, Berkeley, Ref-Anym, and Ref-Berk phrase tables all produce significantly improved results over the GIZA++/Moses baseline results. FIGS. 6 and 7 show graphical representations of the test2007 OOV rate for all five configurations and a respective language pair. For each configuration, a vertical line indicates the range of OOV rates between the "regular" (lower end) and "strict" (upper end); phrase table vocabulary. The regular phrase table vocabulary specifies the OOV rate that would be achieved if, for a given source-language word w appearing in the test set, all bi-phrases containing w exactly matched the test set. If, however, w only appears in a phrase also containing a number of other words, then the only way to translate w is if the entire phrase matches the test set. To be sure of providing a translation for w in any test-set context, w must appear in the phrase table as a phrase of exactly length one: then w is defined as also belonging to the strict phrase table vocabulary.

More formally, w is "strict" if and only if (w, T) is in the phrase table, for some sequence T of target words, w is "actual" if and only if for every source sentence in the test set containing w, there is an (S w S', T) in the phrase table such that S w S' matches the source sentence (S and S' are some sequences of source words); and w is "regular" if there is an (S w S', T) in the phrase table. OOV-strict, OOV-actual and OOV-regular are the complements (relative to the vocabulary in the test set) of strict, actual, and regular. S and S' may be allowed to be of length 0 too. This means a word in the strict vocabulary may also be actual or actual and regular as well.

As an example, consider the bi-phrase from FIG. 1 consisting of "normes . . . 95/35/CE" in French and "relevant . . . 95/35/EC" in English. Even though "95/35/CE" appears on the source side of the phrase, the phrase cannot be applied in translation of the test set unless a test sentence matches the entire 11-word French string "normes . . . 95/35/CE." In order for the word "95/35/CE" to be included in the strict phrase table vocabulary, a phrase table entry like "95/35/CE"↔"95/35/EC" would be needed, where the source word appears alone. The actual number of test-set OOV words lie within the range defined by the regular and strict phrase table vocabulary. The bars in FIGS. 6 and 7 indicate the actual OOV rate on the test set.

For German-English, the best theoretical OOV rate given the present (filtered) training corpus 10 is 265 words (see Table 4 of Example 2 below). This would be achieved if every word in the training data appeared as its own phrase in the phrase table. FIG. 6 shows the actual results obtained. System 1 (baseline GIZA++/Moses) is unable to find English translations for 415 German words. With exemplary System 5 (GIZA++ alignments refined based using Berkeley for the replacement technique), this figure was lowered to 308, or 71% of the difference between System 1 and the theoretical minimum of 265. However, the OOV performance of the exemplary technique is somewhat worse than System 3 (the baseline Berkeley phrase table), which has an OOV rate of 287.

For the French-English systems, the theoretical lower limit is 137 OOV words. In FIG. 7, it can be seen that the baseline performance with Method 1 is 199. Of the two combination techniques (Systems 4 and 5), the Berkeley-based refinement (System 5) gives the best results, reducing the number of OOV types to 151, or 77% of the difference between System 1 and the minimum of 137. Again, the Berkeley baseline (System 3) performs better at an OOV count of 144.

B. Other Translation Scoring Results

It should be noted that OOV is generally not the only factor to be considered in evaluating a machine translation system. The Berkeley baseline (System 3) has fewer untranslated words than the exemplary refined techniques (Systems 4 and 5) for both language pairs. However, the difference in OOV score comes with a cost in the case of the Berkeley system. All three baselines (Systems 1-3) suffer from different problems in terms of output machine translation quality, which are largely avoided with the present method.

Table 1 shows an assessment of output quality according to the BLEU metric, a popular automatic metric for assessing MT system performance. A higher score on the BLEU system suggests a higher quality translation overall. For a description of the BLEU system, see Kishore Papineni, Salim Roukos, Todd Ward, and Wei-Jing Zhu. BLEU: A Method for Automatic Evaluation of Machine Translation. *Proceedings of the 40th Annual Meeting of the Association for Computational Linguistics*, pages 311-318, Philadelphia, Pa., 2002.

TABLE 1

BLEU scores for all configurations

| System | De--En | Fr--En | Average of two corpora |
|---|---|---|---|
| 1. GIZA++ | 0.2742 | 0.3294 | 0.3018 |
| 2. Anymalign | 0.2147 | 0.2630 | 0.2389 |
| 3. Berkeley | 0.2776 | 0.3280 | 0.3028 |
| 4. Ref-Anym | 0.2763 | 0.3290 | 0.3027 |
| 5. Ref-Berk | 0.2777 | 0.3291 | 0.3034 |

As can be seen from Table 1, the Anymalign baseline (System 2) suffers from a significant loss in overall translation quality. This is largely due to its very small phrase table coverage beyond the unigram level.

To differentiate the similar-scoring remaining systems, the automatic evaluation was followed with a small human evaluation of 60 sentences from the French-English test set. For each sentence, judges were presented with the French source sentence and the English translations output by each of the five MT system configurations. Judges fluent in both languages were asked to rank the English translations from best to worst, with ties allowed. Tables 2 and 3 give a summary of the 900 collected judgments, with systems ordered from worst to best in Table 3, according to overall average rank (1=best, 5=worst). Cell values in Table 2 indicate the number of times each system received each rank from a human judge. In Table 3 a distinction is made between OOV and Non-OOV sentences. Non-OOV sentences are those in which all systems can translate all words.

TABLE 2

Aggregate human assessment results

| | Rank | | | | |
|---|---|---|---|---|---|
| System | 1 | 2 | 3 | 4 | 5 |
| 1. GIZA++ | 97 | 36 | 27 | 12 | 8 |
| 2. Anymalign | 19 | 19 | 4 | 25 | 113 |
| 3. Berkeley | 81 | 14 | 11 | 52 | 22 |
| 4. Ref-Anym | 94 | 44 | 19 | 22 | 1 |
| 5. Ref-Berk | 99 | 49 | 20 | 6 | 6 |

TABLE 3

Mean human assessment rank and standard deviation for each system

| System | Non-OOV | Overall |
|---|---|---|
| 2. Anymalign | 4.19 ± 1.37 | 4.08 ± 1.42 |
| 3. Berkeley | 2.74 ± 1.70 | 2.56 ± 1.57 |
| 1. GIZA++ | 1.50 ± 0.86 | 1.88 ± 1.16 |
| 4. Ref-Anym | 1.50 ± 0.72 | 1.84 ± 1.07 |
| 5. Ref-Berk | 1.45 ± 0.64 | 1.73 ± 1.01 |

The Anymalign system (System 2) predictably scores the worst. The two refined systems (Systems 4 and 5) and the GIZA++ baseline (System 1) score consistently quite well. The Berkeley system (System 3), however, perfomed less well than the two refined systems, although better than Anymalign system. Despite its high vocabulary performance, it is unable to consistently use its large phrase table to produce high-quality translations. Indeed, judges gave System 3 nearly as many low rankings (74) as high ones (95). The Berkeley system's relative performance is even worse in sentences where no system produces an OOV word, as shown by the "Non-OOV" column in Table 3.

These results underscore a strength of the exemplary alignment refining approaches: although they are not able to translate quite as many source-language words as the Berkeley baseline, they are still perceived by humans as producing better translations, especially in situations where no other system has a specific OOV advantage.

The exemplary system and method address the problem of vocabulary loss in the phrase-based SMT system-building pipeline. This can be achieved by combining the results of existing word alignment toolkits, although the method is not limited to existing techniques. In the exemplary embodiment, the system and method combine GIZA++ (the existing word alignment standard where coverage for a significant number of words was being lost due to the problem of treating low-frequency words) with another alignment toolkit, such as the Anymalign or the Berkeley aligner (which are able to align more precisely low-frequency words, but suffer elsewhere). The resulting refinement technique combines Anymalign or Berkeley alignments for rare words with the rest of the GIZA++ alignments. Using this method, up to 77% percent of the mid-pipeline vocabulary loss can be regained.

Combining the GIZA++ with Anymalign, output quality equal to GIZA++ and OOV rates better than both GIZA++ and Anymalign can be achieved. While the Berkeley baseline suffers from inconsistent output quality as judged by human evaluators, by combining GIZA++ and Berkeley alignments, better perceived output quality can be achieved than for any baseline, with only a slight loss in vocabulary coverage.

Example 2

Evaluating OOV Rate Across the SMT Pipeline

A directed study was conducted of how each step in the SMT system-building process contributes to the eventual OOV rate on a particular test set. For this evaluation, the Europarl corpus was used for the training corpus, as discussed above (see Koehn 2005). For the evaluation, the Europarl-derived "test2007" test set, described above, was used. The MT system used was a typical baseline Moses system (see Koehn, et al. 2007).

As a first step, the corpus was tokenized. Then, parallel sentences where the token length of one side exceeds the token length of the other by a ratio greater than 4:1 were filtered out. In this step, sentences where either side is longer than 95 tokens were also filtered out. The GIZA++ word alignment system (see, Och and Ney) was run in both source-to-target and target-to-source directions. The resulting alignments were then symmetrized with the "grow-diag-final" heuristic (see, Koehn, et al. 2005). The phrase table was built according to the extraction heuristics of Koehn, et al. 2003 and is used to by the machine translation system to translate the test set after the system has been tuned.

Tests were performed on German-to-English and French-to-English translations. The German system includes a further pre-processing step of splitting apart some long compound nouns based on the unigram probabilities of their components, as calculated on the training data. This step reduces the size of the German vocabulary, but does not impact test-set OOV rate because no new unigrams are created that were not already seen in the training data. Nor are any removed, compared to the test set, because the German test set is pre-processed with the same compound-splitting algorithm. The real effect of this extra processing is to make German-English word alignment easier.

At each step in the above system-building procedure, the source- and target-side unigram vocabulary of the relevant processed data resource (corpus, word alignments, phrase table) was computed as well as what the OOV performance would be on the test2007 set if that processed resource were to form the basis of the final SMT system. For example, if the entire unfiltered German-English Europarl corpus were used directly to translate the test2007 data, there would be 262 German word types in the test set whose English translations could not be produced. This serves as a lower bound on the OOV rate given the input data resources 10. However, when translating the German test2007 test set, 415 OOV tokens are found.

Table 4 shows what happens in between for both language pairs.

TABLE 4

Unigram vocabulary size and test set OOV rate as measured at different points in the system-building pipeline for German--English and French--English MT systems

| Pipeline Stage | De Vocab | En Vocab | De/En OOV | Fr Vocab | En Vocab | Fr/En OOV |
| --- | --- | --- | --- | --- | --- | --- |
| Tokenized parallel corpus | 317,216 | 119,869 | 262 | 33,671 | 126,679 | 133 |
| Filtered parallel corpus | 311,823 | 117,652 | 265 | 128,874 | 123,109 | 137 |
| Compound-split parallel corpus | 204,313 | 117,652 | 265 | — | — | — |
| Source-to-target alignments | 204,312 | 117,474 | 265 | 128,874 | 122,863 | 137 |
| Target-to-source alignments | 204,192 | 117,652 | 265 | 128,769 | 123,109 | 137 |
| Symmetrized alignments | 204,313 | 117,652 | 265 | 128,874 | 123,109 | 137 |
| Moses phrase table | 116,094 | 69,249 | 370 | 90,397 | 79,090 | 178 |
| Moses "strict" phrase table | 94,898 | 54,375 | 427 | 74,128 | 62,179 | 209 |
| Test set test2007 | — | — | 415 | — | — | 199 |

In Table 4, a distinction is made between the "regular" phrase table vocabulary and the "strict" phrase table vocabulary (as defined above). The distinction between the two captures the expectation that words that appear in the phrase table only within multi-word phrases may not be as useful in translating a test set: unless a test set sentence matches the entire phrase containing the word, the system will have no way to produce a translation for it and save it from otherwise becoming OOV. Therefore, the source-side "strict" phrase table vocabulary is measured only from the subset of phrase table entries whose source sides contain exactly one word, and the target-side strict phrase table vocabulary is defined analogously. Another way to state this is that the German-English phrase table can provide English translations for 94,898 German words that appear in any context, while it can provide English translations for 116,094 German words that appear in some contexts.

The results of our OOV pipeline study can be summarized by assigning "blame" for a certain percentage of OOV words to each of the three major pipeline processes: data pre-processing, word alignment, and phrase extraction, or to a default category of not being in the original training data. Broken down in this way, the results are shown in Table 5.

TABLE 5

Categorization of test set OOV words by cause

| OOV Cause | De → En | Fr → En |
| --- | --- | --- |
| Not in original training data | 63.1% | 66.8% |
| Lost in corpus pre-processing | 0.7% | 2.0% |

TABLE 5-continued

Categorization of test set OOV words by cause

| OOV Cause | De → En | Fr → En |
|---|---|---|
| Lost in word alignment | 0.0% | 0.0% |
| Lost in phrase extraction | 36.1% | 31.2% |

The OOV pipeline study demonstrates that the vast majority of the theoretically preventable OOV (and vocabulary size) damage, from the test set's point of view, occurs during the process of bi-phrase extraction. In German-English, 65% of the total OOV degradation from the unfiltered parallel corpus to test set output occurs in this step alone, while in French-English the figure is 57%. Table 5 shows a nearly a bimodal distribution: if an OOV word is not OOV because of not having appeared in the parallel corpus, it is almost certainly because it was lost in phrase extraction. Table 4 also reveals a feature about phrasal context: having access to all the bi-phrases of length on the source side (96% or 97% of the phrase table, depending on language pair) only improves the OOV rate in each system's test set by 12 (German) or 10 (French) types. This is far below the upper bound of 57 types (for German) or 31 (for French) if all phrase table contexts matched the test set. This suggests that the impact of the phrase extraction mechanism on OOV rate should be investigated.

To do this, the identities of the vocabulary items that are present in the word-aligned corpus but not in the phrase table were examined. Even a quick, informal look at a few of these words reveals their key characteristic: they are all very low-frequency words in the parallel data. This was confirmed with a large-scale verification. Among the French words lost in French-English phrase extraction, 82% of them appear only once in the French side of the training corpus, and all but one of them appear less than 10 times. In the German-English system similar proportions are found: 79% of the lost words are singletons, and all but 30 of them occur less than 10 times.

Given this result and the knowledge that the frequency of a word should a priori in no way affect its ability to be extracted by standard SMT phrase extraction heuristics, the sharp decrease in vocabulary size (and thus the sharp increase in OOV rate) can be inferred to be due to a problem in the input to the phrase extraction step: namely the word alignments. The present system and method address this problem by refining the word alignments, leading to smaller and more manageable bi-phrases.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for generating word alignments from pairs of aligned text strings comprising:
   from a corpus of text strings, receiving a pair of text strings comprising a first text string in a first language and a second text string in a second language;
   with a first alignment tool, generating a first alignment between the first and second text strings which creates links between the first and second text string, each link linking a single token of the first text string to a single token of the second text string, the tokens of the first and second text strings including words;
   with a second alignment tool, generating a second alignment between the first and second text strings which creates links between the first and second text strings, each link linking at least one token of the first text string to at least one token of the second text string, and
   generating a modified first alignment by selectively modifying links in the first alignment which include a word which is infrequent in the corpus, based on links generated in the second alignment, the selective modification of the links comprising identifying links in the first alignment to be retained which include the infrequent word and a linked target word where there is a corresponding link present in the second alignment which includes the infrequent word and the same linked target word and identifying for removal, at least a portion of the links in the first alignment which include the infrequent word and a linked target word for which there is no corresponding link between the infrequent word and the linked target word in the second alignment,
   wherein the generation of at least one of the first, second, and modified alignments is performed with a computer processor.

2. The method of claim 1, wherein the generation of the first alignment comprises:
   generating a unidirectional source to target alignment;
   generating a unidirectional target to source alignment; and
   symmetrizing the two unidirectional alignments to generate the first alignment.

3. The method of claim 2, wherein the second alignment tool generates a symmetrical alignment without separately generating unidirectional source to target and target to source alignments.

4. The method of claim 1, wherein the first alignment tool comprises a GIZA++ alignment tool.

5. The method of claim 1, wherein the second alignment tool comprises at least one of an Anymalign alignment tool and a Berkeley alignment tool.

6. The method of claim 1, wherein the second alignment tool enforces a constraint not applied by the first alignment tool which limits which tokens of the first and second text strings are able to be aligned.

7. The method of claim 1, wherein the second alignment tool generates a bi-phrase alignment in which each alignment link includes at least one source token and at least one target token, and wherein for at least some alignments of text strings in the corpus, at least one of the links includes at least one of:
   more than one source word from the source text string; and
   more than one target word from the target text string.

8. The method of claim 7, wherein the modification retains links in the first alignment existing between the target and source words which are present in a bi-phrase alignment output by the second alignment tool.

9. The method of claim 1, wherein the generation of the modified alignment includes establishing a threshold frequency for infrequent words, and the selective modification of the first alignment is conditional at least on there being at least one link in the first alignment which includes a word which is present in the text corpus at no greater than the threshold frequency.

10. The method of claim 1, wherein the selective modification includes removing links in the first alignment which include an infrequent word and which are not present in the second alignment, either in a word link or in a phrase link which includes more than one word from at least one of the target and source text strings.

11. A method for generating word alignments from pairs of aligned text strings comprising:

from a corpus of text strings, receiving a pair of text strings comprising a first text string in a first language and a second text string in a second language;

with a first software alignment tool, generating a first alignment between the first and second text strings which creates links between the first and second text string, each link linking a single token of the first text string to a single token of the second text string, the tokens of the first and second text strings including words;

with a second software alignment tool, which outputs word alignments or aligned bi-phrases, generating a second alignment between the first and second text strings which creates links between the first and second text strings, each link linking at least one token of the first text string to at least one token of the second text string, and generating a modified first alignment by selectively modifying links in the first alignment which include a word which is infrequent in the corpus, based on links generated in the second alignment, the selective modification being conditional on there being a bi-phrase identified in the second alignment to be used as a basis for the modification which has at least a threshold frequency k in the corpus or in a set of sub-corpora generated by sampling the corpus, wherein the generation of at least one of the first, second, and modified alignments is performed with a computer processor.

12. The method of claim 11, wherein the selective modification comprises identifying links in the first alignment to be retained which include the infrequent word and a linked target word where there is a corresponding link present in the second alignment which includes the infrequent word and the same linked target word and identifying for removal, at least a portion of the links in the first alignment which include the infrequent word and a linked target word for which there is no corresponding link between the infrequent word and the linked target word in the second alignment.

13. The method of claim 1, wherein the selective modification further comprises, for linked target words which are in a link to be retained, removing any other links which include that target word and a source word which are not identified for being retained.

14. The method of claim 1, further comprising storing the modified alignment in computer memory.

15. The method of claim 1, further comprising extracting bi-phrases based on the links in the modified alignment.

16. The method of claim 15, further comprising building a bi-phrase table based on the bi-phrases extracted from many of the text strings in the text corpus and a measure of their frequency in the text corpus.

17. The method of claim 16, further comprising constructing a statistical machine translation system incorporating the bi-phrase table.

18. A computer program product comprising a non-transitory computer-readable recording medium storing instructions, which when executed by a computer, perform the method of claim 1.

19. A system for generating word alignments from word aligned text strings comprising:

memory which stores the first alignment tool, the second alignment tool, and instructions for performing the method of claim 1; and a processor which executes the instructions.

20. A system for generating word alignments from word aligned text strings comprising:

instructions stored in memory for receiving a source sentence in a source language and a target sentence in a target language from a text corpus, the target sentence having been automatically identified as being a translation of the source sentence;

instructions for generating a first alignment between the source sentence and the target sentence by forming links, including some links that each link a source word with a target word;

instructions for generating a second alignment between the source sentence and the target sentence by forming links, including some links that each link at least one source word with at least one target word, the instructions for generating the second alignment generating alignments for sentence pairs in the corpus which include fewer links, on average, than the instructions for generating a first alignment;

instructions for identifying of links in the second alignment which comprise infrequent words and based on at least some of these identified links, modifying the first alignment to remove links between the infrequent words present in the second alignment links and other words of the first alignment which do not form a part of one of the identified second alignment links and for identifying links in the first alignment to be retained which include an infrequent word and a linked target word where there is a corresponding link present in the second alignment which includes the infrequent word and the same linked target word.

21. A method for generating word alignments from aligned sentences comprising:

receiving a source sentence in a source language and a target sentence in a target language from a text corpus, the target sentence having been automatically identified as being a translation of the source sentence;

with a processor, generating a first, word alignment between the source sentence and the target sentence by forming links, including some links that each link a source word with a target word;

generating a second alignment between the source sentence and the target sentence by a method which generates alignments for sentence pairs in the corpus which include fewer links, on average, than the method for generating the first alignment, the second alignment including some links that each link at least one source word with at least one target word;

identifying links in the second alignment which comprise infrequent words and based on at least some of these identified links, modifying the first alignment to remove links between the infrequent words present in the second alignment links and other words of the first alignment which do not form a part of one of the identified second alignment links and retaining links in first alignment which include an infrequent word and a linked target word where there is a corresponding link present in the second alignment which includes the infrequent word and the same linked target word.

* * * * *